Figure 1:
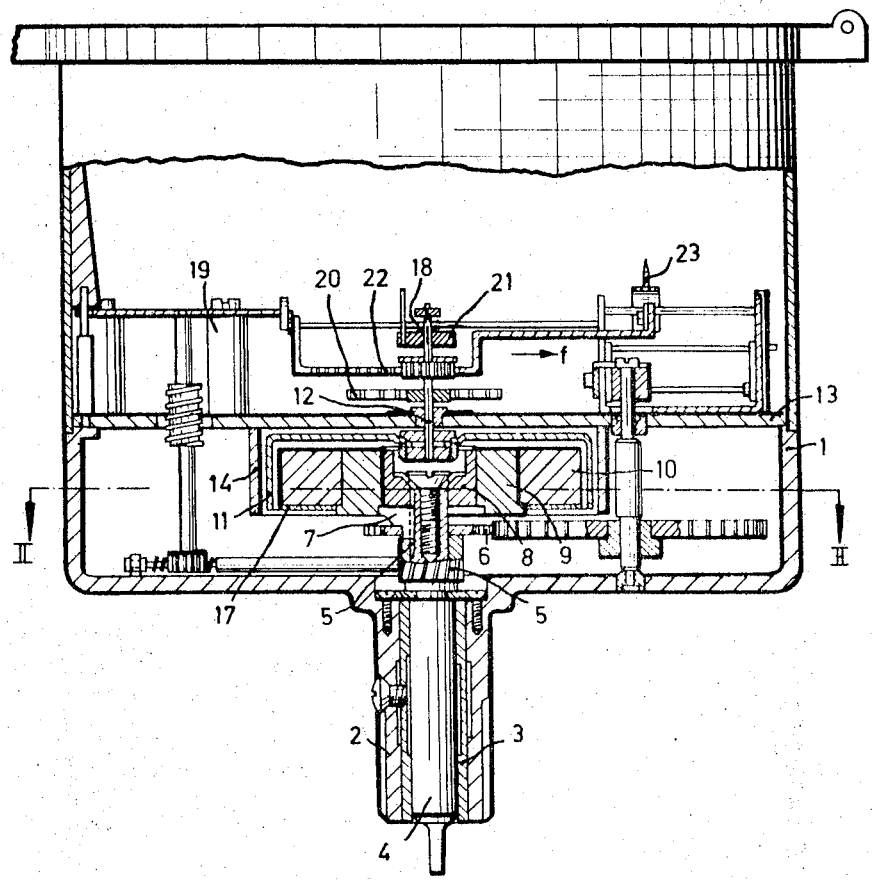

Jan. 10, 1967    O. CHÂTELAIN    3,298,028
RECORDING SPEEDOMETER
Filed Jan. 12, 1965    3 Sheets-Sheet 2

United States Patent Office 3,298,028
Patented Jan. 10, 1967

3,298,028
RECORDING SPEEDOMETER
Oscar Châtelain, La Chaux-de-Fonds, Switzerland, assignor to Zenith SA Fabriques des Montres, Le Locle, Switzerland
Filed Jan. 12, 1965, Ser. No. 424,927
Claims priority, application Switzerland, Jan. 22, 1964, 689/64
3 Claims. (Cl. 346—33)

The use of a speedometer on a vehicle which has in addition to the normal differential, a variable ratio differential is possible only provided said speedometer be driven through the medium of its own gear box which is actuated at each ratio change of the differential, in order that the scale of the curve drawn by the recording pen be maintained unaltered.

The ratio changes of the variable ratio differential and of the speedometer gear box are electrically controlled; however, while the speedometer gear box responds pretty rapidly to that control, the ratio of the differential can be altered only through an additional de-clutching operation on the vehicle engine, followed by the acceleration of said engine.

The ratio changes in the speedometer gear box, however, are not instantaneous, and they generally take place with a delay which can be estimated, on an average, to 20 milliseconds, so that the recording pen of the recording speedometer happens to be self-dependent for a period of time which is sufficient for the pen which plots the speed curve, to be resiliently brought back to the position corresponding to a zero speed of the vehicle, which is actually not the case.

Since the ratio changes of the speedometer gear box are more rapidly achieved than those of the variable ratio differential, the recording pen is then abruptly brought above or under the level corresponding to the actual speed of the vehicle, according to the reduction ratio of the differential. This will result, on the speed chart, in an abrupt decrease or increase of the recorded speed, which are not in conformity with the vehicle rolling conditions; such a recording will therefore pave the way to arguments and errors as regards the speed reached, in particular when the driver of the vehicle is summoned to stop by the police authorities.

It has already been suggested to use recording speedometers provided with an electro-pneumatically controlled additional recording pen serving to plot on the chart a curve extending over two levels according to the level of the two ratio differential; such a speedometer will thus meet the above-mentioned drawbacks only partially since it simply permits to detect the curve apparent variations due to ratio changes in the differential, without however suppressing these variations.

A recording speedometer is also known in which the curve receiving surface is separated from the recording pen whenever the ratio of the two ratio differential is modified, in order to prevent said recording pen to draw the above-mentioned parasitic curves on said surface. In such a recording speedometer, the displacement of said recording surface is achieved by means of a complex electro-magnetic device and a corresponding control circuit; such unit is very fragile and rather cumbersome.

The object of the present invention is precisely to meet the various above-mentioned drawbacks, and, in this respect, provides a recording speedometer characterized in that it comprises means for provisionally holding the recording pen at the position thereof corresponding to the speed of the vehicle when the variable ratio differential is actuated, at least during the period of time necessary for changing the ratio of that differential.

Figure 2:
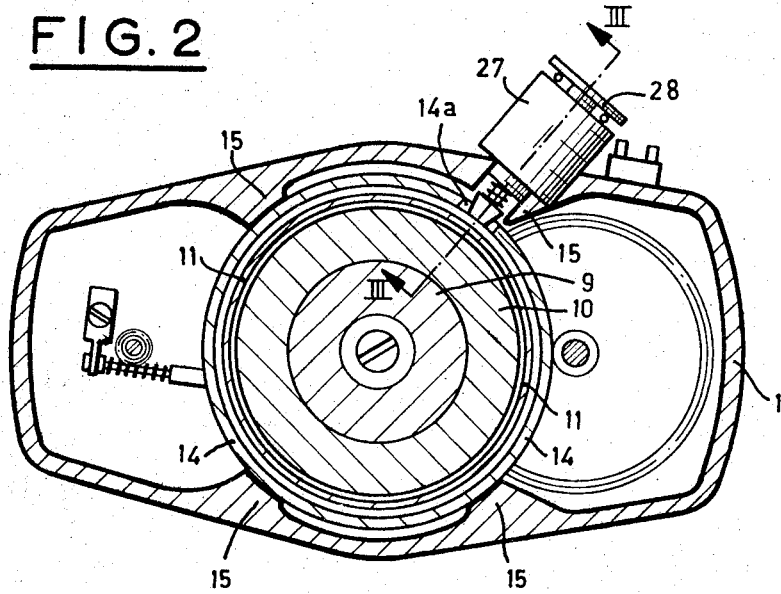
Figure 3:
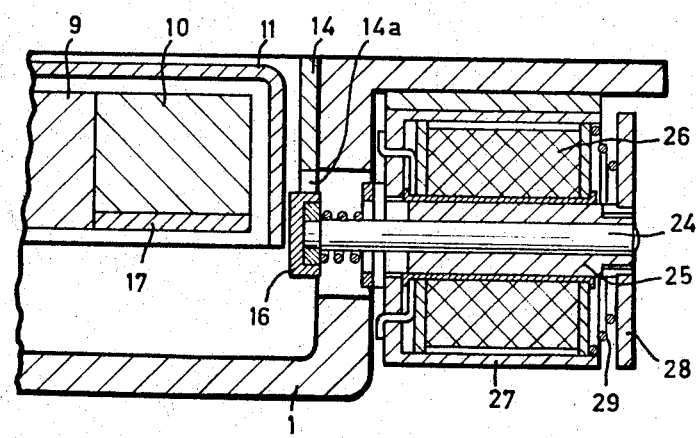
Figure 4:
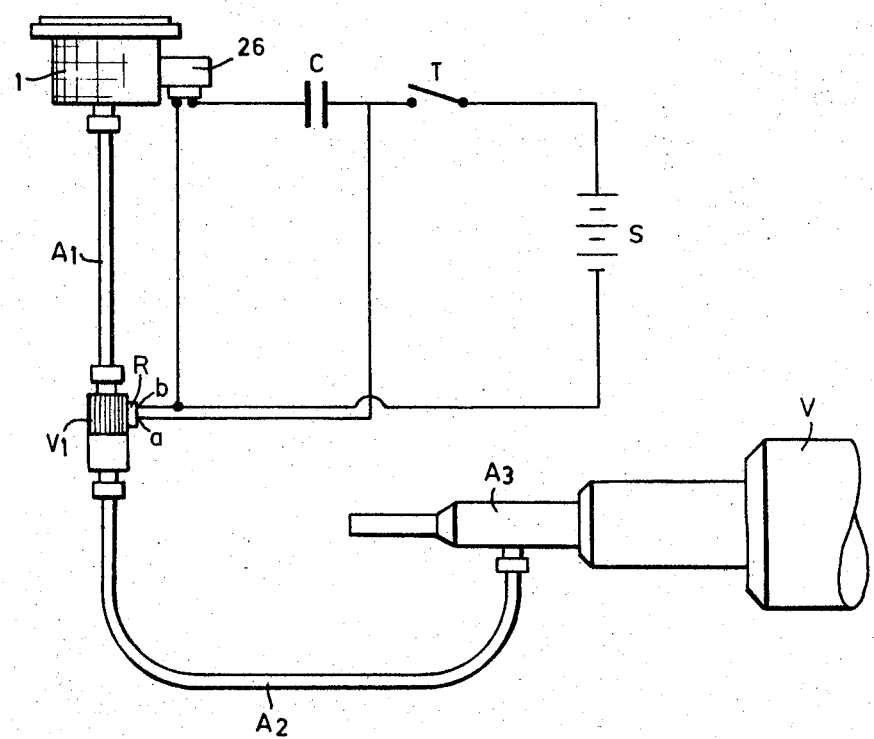

The invention will be described with reference to the accompanying drawing, in which:

FIG. 1 is a cross section of one form of embodiment of the invention,
FIG. 2 is a section along II—II of FIG. 1 and
FIG. 3 is a section along III—III of FIG. 2.
FIG. 4 is a mounting diagram of the recording speedometer in a motor-car.

The recording speedometer shown in the drawing (FIG. 1) comprises a casing 1 at the bottom of which protrudes a sleeve 2 which wraps a bearing 3 for a rotating pin 4 coupled to a flexible stub-axle A1 (FIG. 4), the other end of which is connected to the intermediate shaft of the speedometer two-ratio gear box $V_1$, electro-magnetically controlled by an incorporated relay (R). The primary shaft of that gear box is connected, by means of a flexible shaft A2, to the intermediate shaft A3 of the normal gear box of the vehicle on which the recording speedometer is mounted.

In its upper corner, shaft 4 is provided with a worm-screw 5 and a toothed wheel 6, made integral of shaft 4 by means of a key-bolt 7, and also with its socket 8 resting, by its lower face, on the key-bolt 7 and driven inside a rim 9, for instance of duraluminium, engaged by its outer section into a ring 10 forming a permanent magnet.

The unit formed by socket 8, rim 9, ring 10 is wrapped in a bell 11 of copper, integral with pin 12 pivoting in a plate 13 of the casing, in order to magnetically couple pins 4 and 12.

The flux of magnet 12 is concentrated in the annular portion of bell 11, by a field ring 14 in a magnetisable material, for instance of soft iron or steel, surrounding the outer section of that bell.

That ring is frictionally mounted between four embossments 15 of the casing; in register with one of these embossments, the one located in the right-hand upper corner of FIG. 2, ring 14 is provided in its lower half with an opening 14a for the passage of a brake-shoe capable of acting upon the section of bell 11, as will be described later on.

The flux concentration achieved by means of ring 14 results in an increase of the eddy currents which run in the copper bell and, therefore, in an increase of the torque transmitted. Magnet 10 being in motion, through the rotation of pin 4, bell 11 is angularly displaced under the action of the eddy current by an amount which is proportional to the speed of the magnet. The torque is maintained constant, whatever be the room temperature, by a shunt 17 constituted by a ring of a magnetisable material, the reluctance of which varies inversely as the temperature, whereas the reluctance of cast steel is proportional to same. That ring is fixed to the lower portion of ring 10 by magnetic attraction.

The upper end of pin 12 is pivoted in a bridge 18 mounted above plate 13 on pillars 19. That pin is submitted to the action of a balance-spring 20 and bears a pinion 21 in mesh with a rack, which moves horizontally and bears a recording pen 23.

Whenever, through the rotation of pin 4, bell 11 is angularly displaced against spring 20 by an angle proportional to the rotation speed of magnet 10, rack 22 moves in the direction f, together with pen 23 with which it is integral, until it reaches a given position corresponding to the speed as measured. In the course of that translation movement, the recording pen draws, on a recording surface (not shown) for instance constituted by a chart disk, a curve expressing the speed changes undergone by the vehicle.

The shoe 16 is constituted by a pellet of resilient material, e.g. of plastic material or of rubber, fixed to the end of a pin 24 driven in the core 25 of an electro-magnet, the winding of which 26 is located in a housing 27 fixed to the casing of the recording speedometer. At its right-hand extremity, pin 24 is forced into a disk 28 acting as a stop, and is submitted to the action of a spring 29, which tends to maintain shoe 16 spaced from bell 11, so long as winding 26 is not energized.

That winding is mounted in a circuit comprising a condenser C connected in parallel between the terminals $a$, $b$ of the control relay R of speedometer gear box $V_1$, said relay being connected to a power source S directly by one of its terminals, $b$, and, through a contact T by its other terminal.

When the vehicle driver wishes to change the ratio of the variable ratio differential he closes the contact T thereby simultaneously changing the ratio of speedometer gear box $V_1$, gear box $V_1$ does not make a ratio change immediately but with a certain delay, of the order of 10 to 15 milliseconds; the time spent by the driver for declutching the engine of his vehicle and accelerating said engine in order to modify the ratio of the differential, is of about 1 or 2 seconds as the case may be. Therefore, the brake-shoe 16 must stay applied against bell 11 at least all that time. This is made possible by the present invention, by giving appropriate dimensions to condenser C and to winding 26; it is known in this respect that, when a condenser is connected to the terminals of an electric power source, the current running through that condenser increases exponentially up to a maximum value, in a given period of time. Since the resistance of winding 26 is pretty high, even a small current will energize that electro-magnet and cause the shoe 16 to be displaced towards the bell 11. The values of the capacity C of the condenser and of the resistance of winding 26 are so chosen that shoe 16 remains applied against the bell 11 for a period of time which, in any case, is longer than the average period of time necessary for the ratio change of the back-axle of the vehicle: that average period of time is, as already mentioned above, longer than the time necessary for actuating gear box $V_1$.

The switch T will stay in the closed position so long as the back-axle ratio must be altered with respect to its normal value. When said switch is open, gear box $V_1$ is no longer directly fed by the power source S, but by the discharge of condenser C through winding 26. Since the resistance of the control relay of gear box $V_1$ is by far lower than the resistance of winding 26, said relay will remain energized for a very short while, of the order of 20 to 25 milliseconds for instance, whereas the electromagnet for controlling shoe 16 will be kept energized for a much longer period, sufficient to allow the ratio of the vehicle back-axle to be altered.

The application of shoe 16 against the outer section of bell 11 will immobilize that bell, as already mentioned, in an angular position corresponding to the rolling speed of the vehicle at the beginning of the ratio change of the back-axle of that vehicle; the recording pen 23 is therefore locked with respect to the chart-disk in a position corresponding to that speed for a period of time sufficient for allowing the ratio in the differential to be modified. Since that period of time is rather short, the vehicle speed is maintained substantially constant, so that the position of the recording pen with respect to the chart-disk remains unchanged from the beginning of the ratio change in the differential till the end of that change.

The speed recordings obtained with the speedometer as described above are therefore devoid of any parasitic curve corresponding to the ratio change of a differential, as is the case with recording speedometers known in the art.

What is claimed is:

1. In a recording speedometer for a vehicle having a variable ratio differential with a recording pen, an eddy current coupling adapted to control the displacement of said recording pen, said coupling comprising a bell of non-magnetic material kinematically connected to said pen and a permanent magnet located in said bell and adapted to be driven at a speed proportional to the vehicle speed, means for temporarily holding said pen at the position thereof corresponding to the vehicle speed when said differential is actuated, said means being constituted by a brake capable of acting upon said bell for angularly locking same.

2. In a recording speedometer for a vehicle with a variable ratio differential said speedometer having a mobile core secured thereto with a recording pen, an eddy current coupling adapted to control the displacement of said recording pen, said coupling comprising a bell of non-magnetic material kinematically connected to said pen and a permanent magnet located in said bell and adapted to be driven at a speed proportional to the vehicle speed, means for temporarily holding said pen at the position thereof corresponding to the vehicle speed when said differential is actuated, said means being constituted by a brake capable of acting upon said bell for angularly locking same, said brake comprising a shoe attached to the extremity of said mobile core.

3. In a recording speedometer with a recording pen, for a vehicle with a variable ratio differential, adapted to be driven through the medium of a speedometer gear box, a relay for controlling said gear box, said relay being adapted to be energized through the medium of a contact actuated by the vehicle driver, an eddy-current coupling adapted to control the displacement of said recording pen, said coupling comprising a bell of a non-magnetic material kinematically connected to said recording pen and a permanent magnet located in said bell and driven at a speed proportional to the vehicle speed, means for temporarily holding said recording pen at the position thereof corresponding to the vehicle speed when said variable ratio differential is actuated, said means being constituted by a brake capable of acting upon said bell for angularly locking same, and actuated by an electro-magnet energized by a circuit comprising at least a condenser connected in parallel with said control relay of said gear box, the electric resistance of said electromagnet being chosen high with respect to that of said relay, whereby, when said contact is closed or opened, the duration of the current in said electro-magnet is greater than that necessary for energizing said relay of said speedometer gear box.

References Cited by the Examiner

UNITED STATES PATENTS

| 2,385,399 | 9/1945 | Branham | 346—33 |
| 3,058,654 | 10/1962 | Prohoska et al. | 235—96 |
| 3,132,916 | 5/1964 | Muller | 346—33 |

FOREIGN PATENTS 866,274  4/1961  Great Britain.

RICHARD B. WILKINSON, *Primary Examiner.*

J. G. MURRAY, *Assistant Examiner.*